United States Patent Office 2,957,919
Patented Oct. 25, 1960

2,957,919
DIVERATRYL DISULFIDE AND ITS PREPARATION

Lee Nutting, Berkeley, and Robert M. Silverstein and Chester M. Himel, Menlo Park, Calif., assignors to Hills Bros. Coffee, Inc., San Francisco, Calif., a corporation of California No Drawing. Filed Nov. 4, 1955, Ser. No. 545,136

4 Claims. (Cl. 260—608)

This invention relates to organic compounds and has particular reference to a new organic disulfide compound and its preparation.

This invention has as an object the preparation of a new organic compound. A further object is the preparation of a new organic disulfide, diveratryl disulfide.

Other objects and advantages of this invention it is believed will be readily apparent from the following detailed description.

These and other objects are accomplished by the following invention wherein veratraldehyde is reacted with ammonium sulfide. The crude diveratryl disulfide thus produced may then be purified by reacting the same with amalgamated ether to form the mercaptan which is then oxidized to the disulfide which may be crystallized in pure form.

The invention is illustrated by the following example:

Diveratryl disulfide

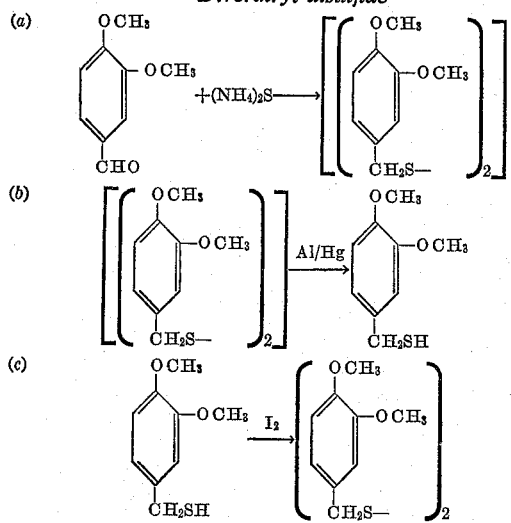

(a) To 60 ml. of a solution of ammonium sulfide in absolute ethanol (prepared by first saturating the alcohol with ammonia, saturating one-half of the solution with hydrogen sulfide and then combining the solutions) was added 2.3 g. of veratraldehyde. The mixture was allowed to stand overnight at room temperature, then evaporated. The oily residue could not be induced to crystallize.

(b) The oily residue was reduced with amalgamated aluminum in moist ether. The mercaptan was distilled at 1 mm. at a head temperature of 98–102° C., weighed 1.3 g., and gave the following analytical values:

|  | Calculated, percent | Found, percent |
|---|---|---|
| Carbon | 58.7 | 59.0 |
| Hydrogen | 6.56 | 6.56 |

(c) A mixture of 0.5 g. of the mercaptan and 10 ml. of a saturated solution of sodium bicarbonate was treated with an aqueous solution of iodine and potassium iodide. The mixture was extracted with ether, the ether solution was washed with alkali, dried, and evaporated. The residue was recrystallized from ethanol to give the disulfide melting at 78–81° C. with the following analytical values:

|  | Calculated, Percent | Found, Percent |
|---|---|---|
| Carbon | 59.0 | 58.8 |
| Hydrogen | 6.05 | 6.17 |

Other oxidizing agents than the iodine of the above example, such as, for example, ferric chloride, lead peroxide, hydrogen peroxide, and copper sulfate, may be used for the oxidation of the mercaptan compound.

The new compounds of this invention are particularly useful as flavoring agents for foods and beverages. For example, 2 parts by weight of diveratryl disulfide and 1 part by weight of each of the following compounds: bis-2-furfuryl disulfide; bis-(3-indolemethyl) sulfide (disclosed in our copending application Serial No. 525,353, filed July 29, 1955, entitled Heterocyclic Sulfides and Their Preparation); bis-2-furfuryl sulfide (also disclosed in said copending application Serial No. 525,353); 2-furfuryl isothiocyanate (disclosed in our copending application Serial No. 525,355, filed July 29, 1955, now Patent No. 2,905,701, entitled Heterocyclic Isothiocyanates and Their Preparation); 2-thenyl isothiocyanate (also disclosed in said copending application Serial No. 525,355); comprising a total of 100 mg. was dissolved in 900 mg. of a solvent such as furfuryl alcohol. Portions of this solution may be directly added to a prepared cereal-based beverage such as "Instant Postum" to enhance the flavor thereof, or similar results may be obtained by incorporating the flavoring agent during the manufacture of the cereal-based beverage concentrate, such as by adding it to the liquid material prior to the final drying step. For example, when flavoring the prepared cereal-based beverage, 12 mg. of the furfuryl alcohol solution are added to 100 cc. of beverage containing 1.5% soluble and dispersible solids. When using the furfuryl alcohol solution in the manufacture of the cereal-based beverage concentrate, about 1 oz. of the furfuryl alcohol solution is used for each 8 lbs. of the final dried product. In either case, a beverage especially acceptable to some tastes may be obtained by adjusting the pH to about 5 by the addition of citric acid or the like.

The above description and examples are intended to be illustrative only. Any modification of or variation therefrom which conforms to the spirit of the invention is intended to be included within the scope of the claims.

We claim:

1. Diveratryl disulfide.

2. In a process for the preparation of diveratryl disulfide, the step of reacting veratraldehyde with an alcohol solution of ammonium sulfide.

3. In a process for the preparation of diveratryl disulfide, the step of reacting veratraldehyde with a solution of ammonium sulfide in absolute ethanol.

4. In a process for the preparation of diveratryl disulfide, the steps of reacting veratraldehyde with an alcohol solution of ammonium sulfide, evaporating the mixture to produce an oily residue, adding amalgamated aluminum in moist ether to said residue to produce veratryl mercaptan, and then adding an aqueous solution of iodine to said mercaptan to oxidize the same.

No references cited.